Oct. 12, 1937.  A. J. DIESCHER  2,095,410
COMBINATION STOP AND CHECK VALVE
Filed May 28, 1934  3 Sheets-Sheet 1
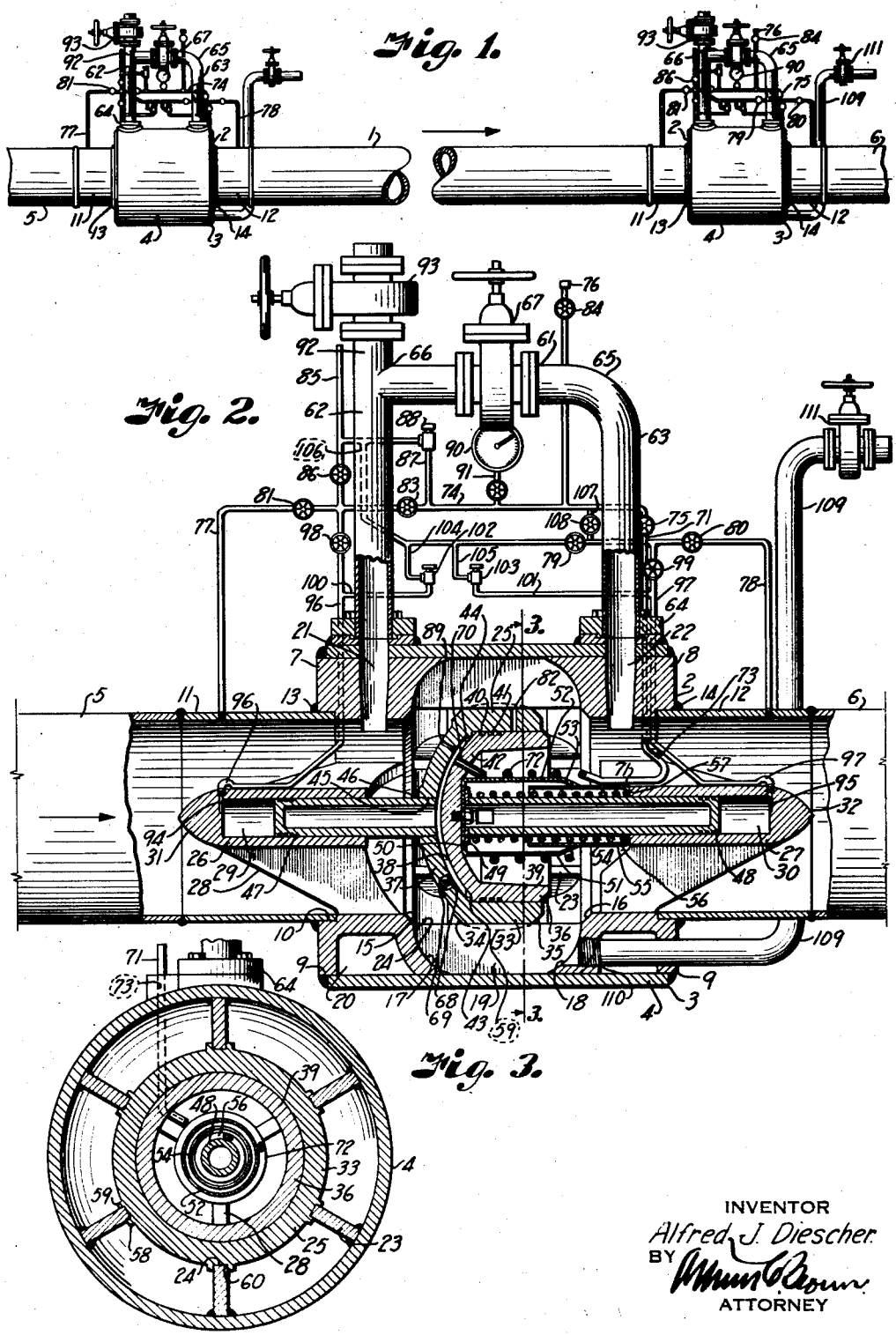
INVENTOR
Alfred J. Diescher
BY
ATTORNEY Oct. 12, 1937.     A. J. DIESCHER     2,095,410
COMBINATION STOP AND CHECK VALVE
Filed May 28, 1934     3 Sheets-Sheet 2
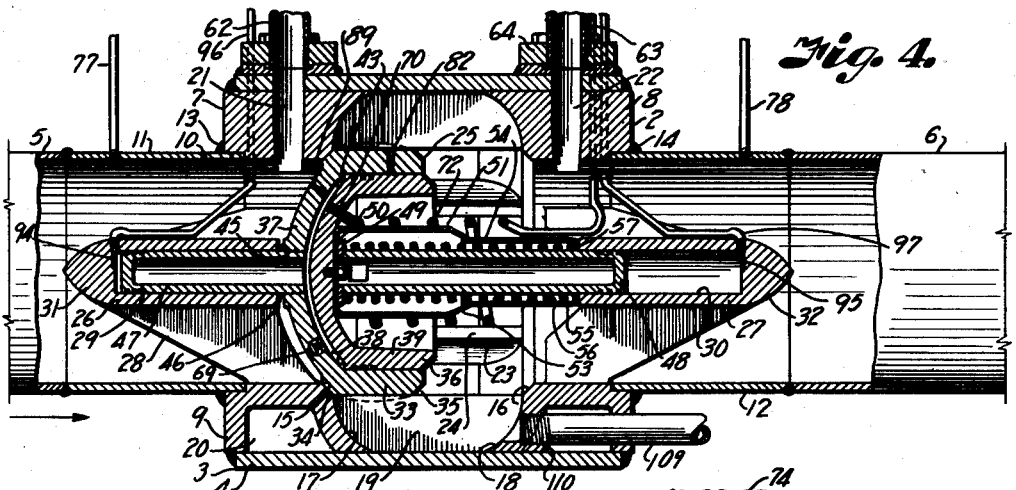
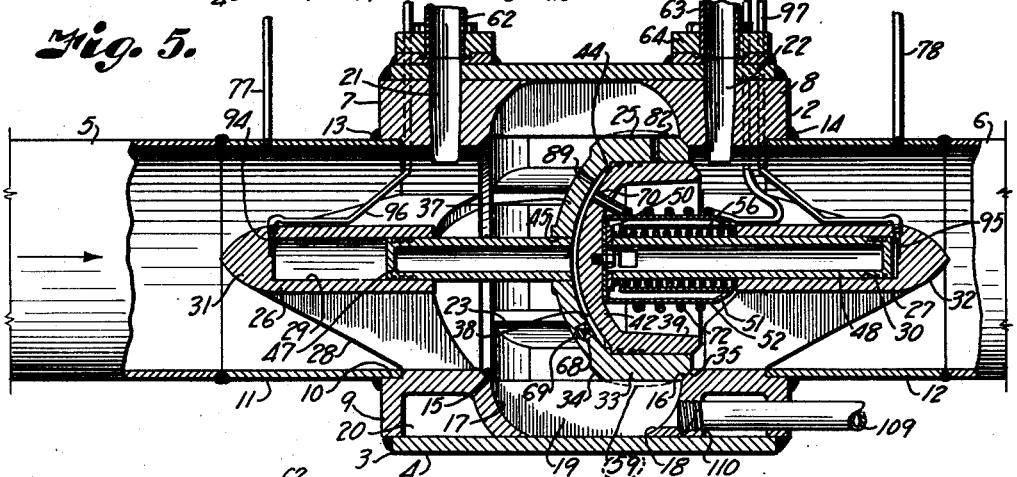
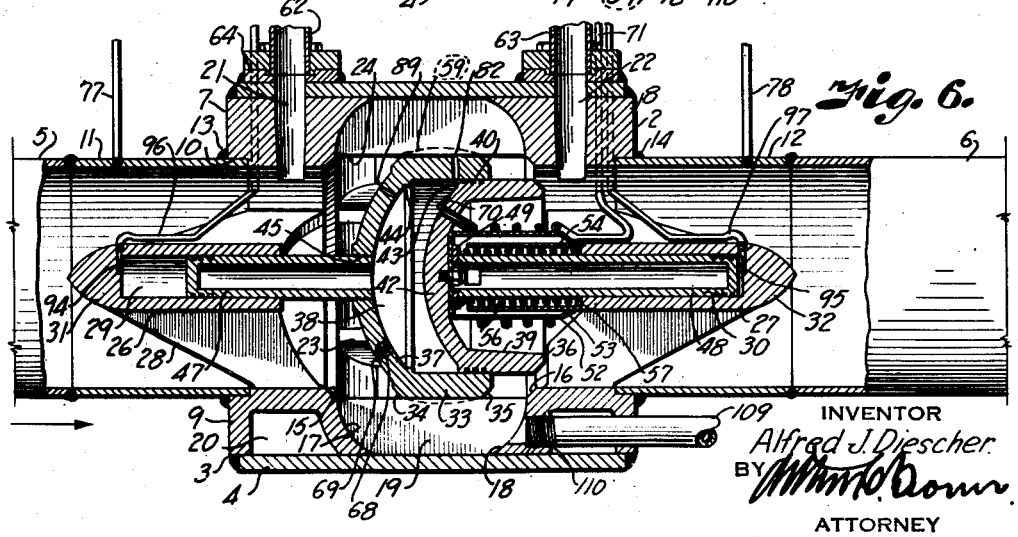
INVENTOR
Alfred J. Diescher
BY
ATTORNEY Oct. 12, 1937.  A. J. DIESCHER  2,095,410
COMBINATION STOP AND CHECK VALVE
Filed May 28, 1934  3 Sheets-Sheet 3
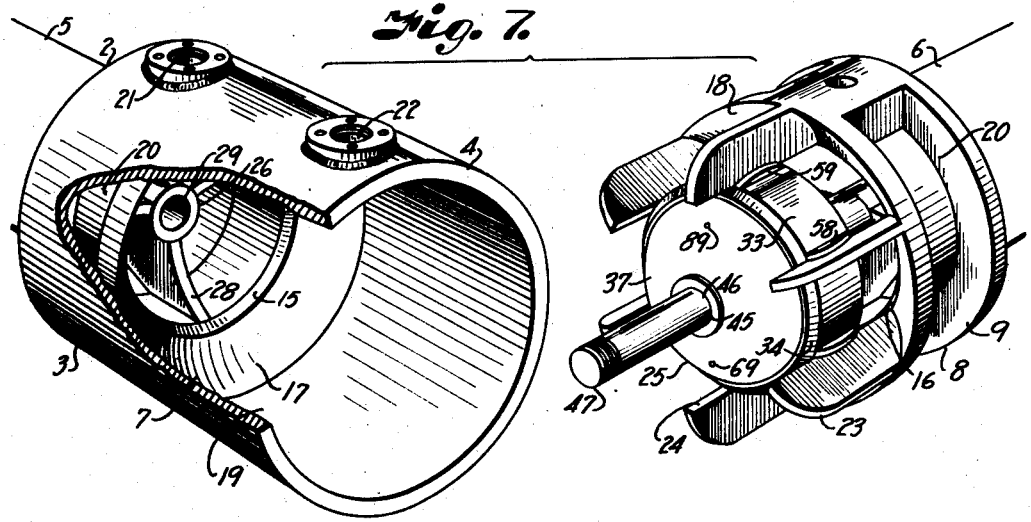
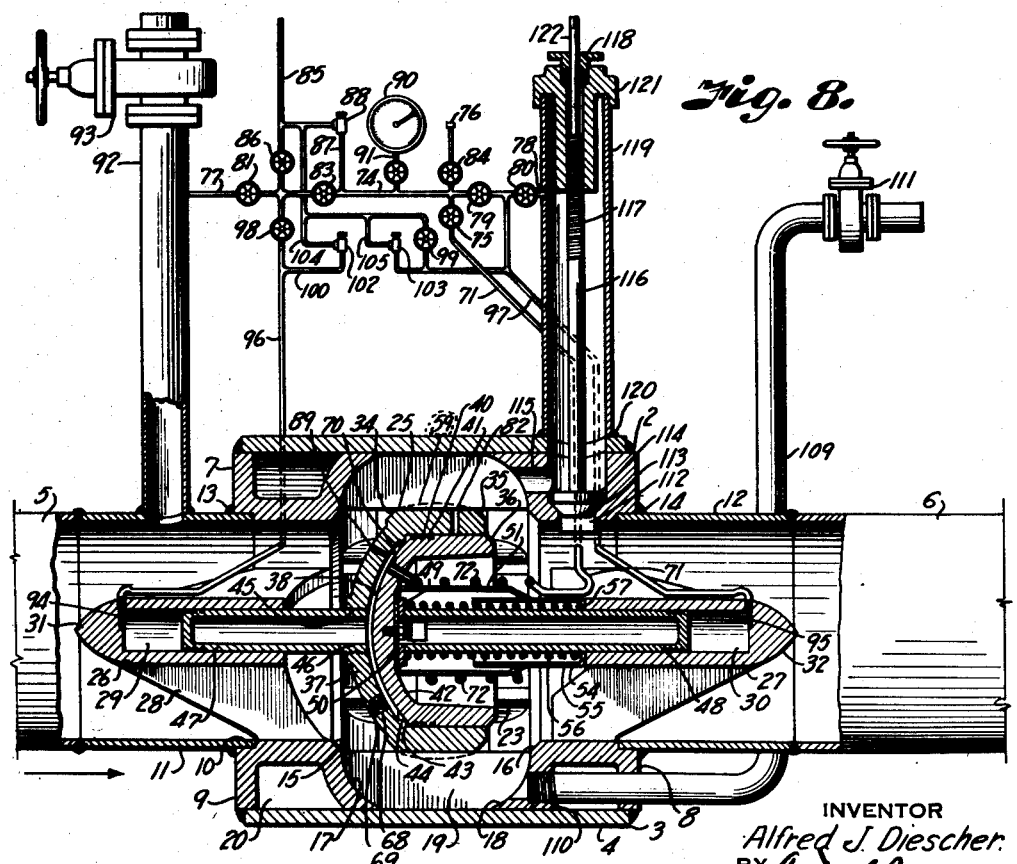
INVENTOR
Alfred J. Diescher.
BY
ATTORNEY Patented Oct. 12, 1937

2,095,410

UNITED STATES PATENT OFFICE 2,095,410

COMBINATION STOP AND CHECK VALVE

Alfred J. Diescher, Winfield, Kans., assignor of one-half to M. L. R. Diescher, Winfield, Kans.

Application May 28, 1934, Serial No. 727,855

12 Claims. (Cl. 137—153)

This invention relates to a combination stop and check valve and particularly to a valve of this character for controlling and regulating flow of fluids through pipe line systems, such as are used in transporting oil, gas and other similar fluids from a source of supply to a point of delivery.

Transportation lines of this character are operated under high pressures and are in constant danger of breakage, which not only results in loss of fluid but seriously interferes in efficient operation of the system. In order to reduce such losses and to maintain efficiency of operation, I have disclosed the use of double acting check valves which are inserted at suitable intervals in the line and which function automatically in case of a line break, as disclosed in my co-pending applications, Serial No. 592,939, filed February 15, 1932 and Serial No. 598,424, filed March 12, 1932.

At times it becomes necessary to close off branch lines or to isolate certain sections of the system when making repairs, such as, for example, to change a section of pipe which has been corroded by attack of the soil acids. These operations, therefore, require closing flow through the lines other than on the occasions of a pipe line break.

It is, therefore, the principal object of the present invention to provide manually operable means for effecting operation of selected check valves when it becomes necessary to stop flow through selected portions of the system.

In accomplishing this and other objects of the invention as hereinafter set forth, I have provided improved details of structure, the preferred forms of which are illustrated in the accompanying drawings, wherein:

Fig. 1 is a side view of a portion of a pipe line equipped with valves embodying the features of the present invention.

Fig. 2 is an enlarged sectional view through one of the valves illustrating the check member in neutral position between the respective valve seats.

Fig. 3 is a cross section on the line 3—3, Fig. 2.

Fig. 4 is a section similar to Fig. 2 showing the check member seated against line flow.

Fig. 5 is a similar view showing the check member engaging the opposite seat.

Fig. 6 is a similar view showing the check member being moved from the seated position shown in Fig. 5 to open position.

Fig. 7 is a detail perspective view of the parts composing the valve housing showing one of the end heads removed to better illustrate the supporting ribs for guiding the check member.

Fig. 8 is a longitudinal section through a modified form of valve.

Referring more in detail to the drawings:

1 designates a pipe line through which fluid is transported from a source of supply to a distant point under pressure by means of compressor or pump stations located along the line, as the case may be. Located in the line at suitably spaced points, for example, every five miles more or less, are combination automatic check and stop valves 2 which embody the features of the present invention, each valve being adapted to be closed in either direction. The valves are of identically the same construction and, therefore, only one will be described in detail, the numerals used in designating the parts of the valve described applying to the corresponding parts of the other valves.

As illustrated in Fig. 2, a valve 2 includes a housing 3 comprising a tubular wall portion 4 of larger diameter than the sections of the pipe 5 and 6 in which the valve is installed, and which has its ends closed by heads 7 and 8. Each head includes a ring portion 9 having a press fit within the wall portion 4 and having an inner diameter substantially equal to that of the inner diameter of the pipe. The outer face of each ring is provided with an annular recess 10 to receive the ends of nipples 11 and 12 which are welded therein, as shown at 13 and 14, while the corresponding inner faces of the rings are provided with bevelled valve seats 15 and 16 for seating a check member hereinafter described.

The inner face of each ring surrounding the valve seats is provided with fillets 17 and 18 merging into contiguity with the inner face of the wall portion 4 to cooperate therewith in forming a valve check chamber 19.

In order to reduce weight of the heads, the peripheries of the rings are hollowed out, as at 20, with the exception of points where it is necessary to provide radial ports 21 and 22 for a purpose later described. One of the heads, for example the one designated 8, carries a series of radial ribs 23 extending laterally from the valve seat side and having rounded ends to fit within the fillet portion of the head, or both heads may have such ribs abutting where they meet between the heads.

The inner edges 24 of the ribs connect the heads at substantially the outer edge of the valve seats and constitute supporting guides for the check member 25 which is slidable between the seats.

Carried by the heads 7 and 8 are cylinders 26 and 27 having radial arms 28 connecting them with the inner face of the rings to retain the cylinders in concentric alignment within the axis of the valve. The cylinders 26 and 27 have piston chambers 29 and 30 opening from the inner ends thereof, but the outer ends are closed by stream lined integral heads 31 and 32 to facilitate flow of fluid and eliminate tendency of fluid to eddy about the cylinders.

The valve check member 25 comprises a cylinder having an annular wall 33 provided with bevelled edges 34 and 35 on its opposite ends conforming in size and shape to the valve seats 15 and 16, respectively. One end of the check member is open to receive a check piston 36 but the other is closed by a dome-shaped head 37 cooperating with the wall portion 33 and head of the piston to form a closed chamber 38.

The check piston member 36 includes a skirt portion 39 having a sliding fit within the chamber 38 and which is sealed therewith by means of packing rings 40 that are mounted in groves 41 in the piston. The head 42 of the piston may conform in shape to the concavity of the cylinder head, but is spaced therefrom by a shoulder 43 thereon engaging against an annular shoulder 44 in the piston chamber.

Formed in the head of the check member 25 in axial alignment with the cylinder 26 is an internally threaded socket 45 for mounting the threaded end 46 of a piston 47 that is slidably mounted in the piston chamber 29. The check piston member 36 carries a similar piston 48 having its inner end welded to a washer 49 which in turn is welded to the end wall 50 of a spring housing member 51 that is secured to the check piston member 36.

The spring housing member 51 has a sleeve portion 52 extending in concentric spaced relation to the piston 48 and has an inturned outer end 53 slidable over a cooperating housing member 54. The member 54 includes a sleeve portion 55 that is also spaced from the periphery of the piston 48 to accommodate a spring 56 and has its outer end flanged inwardly, as at 57, to engage the piston and to form an abutment against the inner end of the cylinder 27.

The spring 56 is coiled about the piston and has one end bearing against the washer 49 and the other against the inturned flange 57 of the spring housing member 54 to normally retain the check piston member in central position within the check chamber 38.

When in this position the spring 56 is substantially relaxed and has no tendency to move the check piston in the direction of the seat 15, the principal purpose of the spring being to normally prevent seating of the check member against the seat 16 under force of normal flow through the valve; however, should the rush of fluid through the valve become excessive, the spring 56 will readily compress to allow seating of the check member against the seat 16.

Thus under normal flow through the valve in the direction of the arrow (Fig. 2), the force of the flow acting against the head 37 keeps the internal shoulder 43 of the check member in engagement with the shoulder 44 on the check piston, but it cannot move to seated position because the force of flow must first overcome the inertia and friction of the check parts plus the resistance of the spring 56. In this position the heads of the pistons 47 and 48 are equally spaced from the ends of their respective chambers and the parts are in balanced position.

Should the flow towards the seat 16 become excessive, as in case of a line break in the pipe section 6, the increased surge of the fluid caused by the break will readily seat the check member against the seat 16 and stop the flow through the valve, as shown in Fig. 5. Likewise, should a break occur in the section of pipe 5, the reverse rush of fluid tending to escape from the line will cause seating of the check member against the seat 15 to shut off flow through the valve, as shown in Fig. 4.

In both instances the check piston and check members move together as a unit. In order to prevent the parts from rotating during movement, the periphery of the check is preferably provided with spaced ribs 58 and 59 to provide grooves 60 that receive the inner edges 24 of the guide ribs 23, as best illustrated in Fig. 3.

After the check member has seated, the pressure of fluid in the valve retains the check in engagement with its seat. In large pipe lines operating under high pressures, the force acting to hold the check closed is such that it requires a large amount of power to unseat it after the cause of the sudden rush of flow has been corrected, particularly when the check member seats against the seat 16 on the outlet side of the valve, as shown in Fig. 5.

In order to reduce the power required in opening the check member, the valve is provided with a bypass 61 including conduit sections 62 and 63 communicating with the ports 21 and 22 and connected with the valve housing by flanged plates 64 that are welded to the ends of the conduits and bolted to similar plates that are welded to the wall portions for the housing, as illustrated in Fig. 2.

The conduit 63 terminates in a right angular bend 65 and connects with the conduit 62 as at 66 so that fluid may flow from the high pressure side through the interconnected conduits into the low pressure side upon opening of a valve 67 connected in the conduit section 63; however, equalization of the pressures through this means is slow because the empty pipe section must be filled with fluid at the pressure of the fluid at the other side of the check before the spring 56 can act to move the check member from the seat 16 and due to the fact that the fluid has been continually drawn from the delivery end of the line, the pressures in that portion of the line have dropped to such an extent that it is desirable to provide positive means to open the check so that it is not necessary to wait for the pressures to become equalized.

This may be accomplished by providing the head 37 of the check member with a spring pressed valve 68 normally closing a port 69 therein which communicates with the inlet pressure side of the valve and through which high pressure fluid is admitted into the check chamber 38 tending to equalize the pressure acting against the outer side of the check member so that the cylinder member of the check valve moves away from the piston member and off of the valve seat as the piston member will abut the ribs 23 and remains stationary whereon the spring 55 will be effective in fully opening the check member when the pressures on opposite sides have equalized to a certain predetermined extent.

The check member may be opened sooner by providing means for injecting an external pressure within the interior of the check member, as now to be described.

This is accomplished by providing the head 42 of the check piston 36 with a port 70 to which is connected one of the terminals of a flexible conduit 71 including a portion 72 coiled about the spring housing to allow movement of the check piston. The other terminal of the conduit is welded into and extends through a suitable opening 73 in the end head 8 and connects with a conduit 74 having a valve 75 and an inlet connection 76 whereby external pressure may be admitted to the conduit.

The external pressure may be supplied by a small portable compressor or from bottled gas containers carrying the pressure required for operating the valve parts, so that when the pressure is admitted into the chamber 38, it will act against the inner face of the head 37 and against the head of the check piston to effect lifting movement of the check member from the seat 16 and allow flow of fluid through the valve.

If desired, this pressure may also be supplied from the high pressure side of the valve through conduits 77 and 78, each having one end connected with the nipples 11 and 12 respectively and its other end to the conduit 74; the conduit 78 being provided with valves 79 and 80 and the conduit 77 with a valve 81 to close flow therethrough under normal operation of the line.

When the check member has been moved to open position, as shown in Fig. 6, the check piston will have uncovered a port 82 in the cylinder wall portion of the check member to allow release of the higher pressure fluid and stop movement of the check member, thereby preventing it from moving off the check piston or engaging the seat 15.

As soon as the port has been uncovered, the spring 56 will tend to move the check piston to normal position, but as soon as the port is closed, the high pressure fluid is again trapped within the check piston chamber and it is necessary to allow relief of pressure through the conduit 71 by opening the valve 83 and closing the valve 84. The pressure will then escape to atmosphere through a branch conduit 85 that is connected with the conduit 75 at a point between the valves 81 and 83, the exhaust conduit 85 being provided with a valve 86 which, when opened, will allow escape of the pressure to atmosphere.

Should the pressure become excessive in the check piston chamber, I provide means for automatically releasing excessive pressure in the line 74 through a conduit connection 87 by-passing the valves 83 and 86 and which is provided with a pop-off valve 88.

The check member may be provided with a small vent port 89 whereby the high pressure fluid may bleed from the chamber into the line. If the check member engages the opposite seat 15 as in case of a break in a section of the line ahead of the valve, the higher pressure, when re-established in the inlet side will readily move the check member to open position because of the drop in pressure at the outlet side of the valve by reason of the continued line service draining fluid from the delivery end of the line. Opening of the valve may also be hastened by opening the valve 67 to permit flow of fluid from the outlet side of the valve into the inlet side to help the pump or compressor stations in building up the pressure in the section of the line having the break.

Pressures in the conduit 74 will be indicated by a suitable pressure indicator 90 that is connected thereto by a valved conduit 91, Fig. 2.

As above pointed out, it is the principal object of the present invention to provide in addition to the foregoing, means for seating and unseating of the check member upon either inlet or outlet seat other than under the emergency conditions above described, whereby under certain conditions the valve may function as a gate or globe valve.

As an example of a condition requiring the valve to shut off flow through the line in the manner of a gate or globe line, it may be considered that a section of the pipe line has been corroded by attack of soil and it is necessary to replace that section. It is, therefore, necessary that the defective section be isolated from the remaining portion of the line and drained of fluid. In this instance, the violent rush of fluid through the check valve, which occurs on a line break, is not available to close selective checks on opposite ends of the defective section.

One manner of causing the check valve to close for such repair is to insert in the trunk line between two consecutive double acting check valves a bleeder or relief gate which will permit a rush of gas out of the section to be drained. The check members of the two respective valves on opposite sides of the bleeder could, therefore, be brought to seating position for isolating the section needing the repair. In the illustrated instance, such a bleeder 92 is shown as connected to the by-pass of the check valve and is controlled by a valve 93 whereby fluid may be drained through the line to cause a sudden surge to effect seating of the selected valves.

Such a method, however, while operative, is rather costly in view of the large amount of fluid which would have to be lost through the check valves from the other sections of the line. The cost may amount anywhere from a few dollars to hundreds of dollars for one closing and it is, therefore, desirable to provide each check valve with means for positively moving the check to either one of the seats when the case requires, under manual control of the pipe line operators. This is accomplished by injecting into the piston cylinder chambers 29 and 30 high pressure fluid from the inlet connection 76 in substantially the same manner as when applying the high pressure fluid between the check members to effect unseating thereof.

Each end of the respective cylinder chambers is provided with ports 94 and 95 that are connected by conduits 96 and 97 which extend from the housing through suitable openings similar to the conduit 71 previously described. The conduits 96 and 97 are provided with valves 98 and 99 respectively and connect with the conduit 74 wherethrough high pressure fluid may be directed to either one of the cylinders.

The conduits 96 and 97 are also connected with the exhaust conduit 85 by branch conduits 100 and 101 having pop-off valves 102 and 103 for releasing excess pressure in the conduits when the pressure reaches a certain predetermined value. The outlet connections 104 and 105 of the pop-off valves are connected by a common conduit 106 having one end connected with the exhaust conduit 85 and the other end to the conduit 97, the conduits 106 and 74 being connected by a conduit 107 having a shut-off valve 108.

Assuming that it is necessary to stop flow through the valve in the direction of its outlet side, the check member will, therefore, be moved to seat against the seat 16. This is accomplished by connecting the inlet fitting 76 with a fluid pressure supply and opening the valves 84, 83 and 98, the valves 75, 80, 81, 86, and 108 are left closed so that the pressure is delivered directly into the piston chamber 29 to act against the piston 47. Upon opening of the valves 99 and 79, the piston cylinder 30 will be vented through the conduits 97 and 106 to atmosphere through the exhaust conduit 85 to allow the high pressure fluid to move the check member and check piston toward the seat 16. This can also be accomplished by injecting line pressure into chamber 29 through conduit 77 and venting chamber 30 through conduits 97 and 85 and vice versa to move check toward seat 15. The check members can be moved toward either seat by either external or pipe line pressure from either side of the check as desirable. When the check member has been seated, the valve 98 may be closed to retain the pressure in the check member to keep the check member in seated engagement with the seat 16, thereby stopping flow through the valve until the repair has been made.

When it is again desired to open the check valve the valves 98 and 86 are opened and the valve 83 closed to allow exhaust of high pressure fluid from the piston chamber 29. The check member may then be moved to open position by either admitting high pressure fluid into the check piston chamber as above described, or if the pressure differential across the check member is low enough to thus permit unseating, the valve 108 may be opened and the valve 79 closed to admit high pressure fluid to the piston chamber 30.

This will effect movement of the check piston and consequently the check member because the shoulder 43 on the piston engages against the stop shoulder 44 on the check member to effect simultaneous movement thereof aided by the stored tension of the spring 56.

When the check member has been moved to neutral position, the valves in the high pressure conduits may be restored to normal position, i. e., the valves controlling supply of high pressure fluid are closed and the valves communicating the piston chambers with the exhaust conduit 85 are opened, thereby freeing the check members to function in response to sudden surge of fluid through the valve in case a line break should occur.

To seat the valve in the opposite direction, high pressure fluid is supplied by the line 97 to the chamber 30 and exhausted from the chamber 29 through the conduit 96.

Scale and dirt may accumulate in the check valve housings, and to provide means for removing such material, each check valve housing is provided with a blow-off conduit 109 connected with the lowermost portion of the valve housing as at 110 and having its outer end provided with a stop valve 111 which, when opened, will allow flow of fluid from the valve housing to effect removal of the material.

There may be instances when the high pressure fluid required to move the check member is available from the fluid in the line which pressure may be admitted to either of the respective cylinder chambers 29 or 30 upon opening the valve 80 or valve 81, as the case may be.

In Fig. 8 is shown a modified form of by-pass wherein the by-pass forms an integral part of the valve housing. In this instance the head 8 is provided with a port 112 having a valve seat 113 that is normally closed by a valve 114 which closes communication between the port 112 and a lateral port 115 opening to the opposite side of the valve seat 16. The valve 114 is operated by a rod 116 having a threaded portion 117 threadedly engaged in a packing box 118 carried on the upper end of a tubular housing 119 enclosing the valve rod. The housing may include a pipe section having its lower end welded to a valve housing as at 120 and having its upper end closed by the member 121. Extending upwardly through a packing gland 118 is a reduced extension 122 for effecting rotation of the rod to move the valve 114 to and from seating position.

It is thus apparent that when the check member engages the seat 16, pressure may be equalized on opposite sides thereof in the same manner as the by-pass illustrated in Fig. 2 simply by opening the valve 114 so that fluid may flow from the check chamber 19 through the port 115, valve seat 113 and port 112 into the outlet side of the valve. The bleeder fitting 92 in this instance is connected directly to the nipple 11 on the inlet side of the valve.

From the foregoing description it is apparent that I have provided a valve construction that will successfully operate in either direction to shut off flow of fluid in case of line breakage and that the valve is readily reopened against high pressures to reestablish flow after the break has been repaired, and that the same valve can be utilized as a gate or stop valve either by opening the bleeder 92 to effect a surge of fluid through the valve housing or by applying high pressure fluid to the piston chambers 29 or 30 depending upon which direction it is desired to set the check members.

What I claim and desire to secure by Letters Patent is:

1. A double acting valve including a housing having an inlet and an outlet provided with check seats, a check member movable in the housing to engage either of said seats and having a check piston cylinder therein, a check piston in the cylinder, a piston connected with the check member, a piston connected with the check piston, cylinders in the housing for mounting said pistons, means for selectively applying external pressure to said cylinders to seat the check member on one of said seats, and means for maintaining a constant pressure in said check piston cylinder during movement of said check member whereby said pressure tends to restore said check member to neutral position upon release of said external pressure.

2. A double acting valve including a housing having an inlet and an outlet provided with check seats, a check member movable in response to difference in pressure within the housing to engage either of said seats and having a check piston cylinder therein, a check piston in the cylinder, a piston connected with the check member, a piston connected with the check piston, cylinders in the housing for said pistons, means to which the valve is adapted to be connected for admitting line pressure into said check piston cylinder, means communicating with the line for selectively applying external pressure to said cylinders to seat the check member, and means for maintaining a constant pressure in said check piston cylinder during movement of said check member whereby said pressure tends to restore said check member to neutral position upon release of said external pressure.

3. A double acting valve including a housing having an inlet and an outlet provided with opposite facing seats, a check member in the housing having seating faces on respective ends for respectively engaging said seats responsive to a sudden surge through the housing, means for retaining the check member in neutral position between said seats, external means operable upon said check member to seat said check member independent of said surge, and external means operable upon said check member to effect unseating thereof.

4. A double acting valve including a housing having an inlet and an outlet provided with check seats, a check member movable in response to sudden abnormal surges within the housing to engage the check seat in the direction of the surge and having a piston chamber therein, a piston in the chamber, a valve in the check member for admitting high pressure fluid into the chamber, whereby said fluid tends to unseat the check member, a by-pass around said check member to effect equalization of pressure on opposite sides of said check member to permit said high pressure fluid to unseat said check member, and pressure actuated means connected with the piston and check member to selectively seat said check member independently of said sudden abnormal surge.

5. A valve including a housing having oppositely facing seats, check means movable within the housing and adapted to engage either of said seats upon differential in pressure at opposite sides of the check means and including a pair of members supported in the housing for independent movement relatively to each other and having interengaging means whereby pressure impact of fluid acting against one member seats said check means on the seat opposite said member receiving the impact in response to an abnormal surge through the housing, means communicating with the interior of the check means for admitting internal pressure between said members, means communicating with the interior of the check means for establishing a differential internal pressure between said members to effect unseating of the check means, and means for selectively seating said check means independently of an abnormal surge.

6. A valve including a housing having an inlet and an outlet port provided with a check seat, a check member movable in response to sudden abnormal surges within the housing to engage said seat and having a piston chamber therein, a piston in the chamber, means for admitting high pressure fluid into the chamber whereby said fluid tends to unseat the check member, a by-pass around said check member to effect equalization of pressure on opposite sides of said check member to permit said high pressure fluid to unseat said check, and separate fluid pressure actuated means connected with the piston and with the check member respectively to seat said check member independently of said sudden abnormal surge.

7. A valve including a housing having a check seat, check means movable within the housing and adapted to engage said check seat upon differential in pressure at opposite sides of the check means and including a pair of members supported in the housing for independent movement relatively to each other and for movement in response to abnormal surge through the housing by momentum of the surge acting directly against said check means to engage said seat, means communicating with the interior of the check means for admitting internal pressure between said members, means communicating with the interior of the check means for establishing a differential internal pressure between said members to effect unseating of the check means, and fluid pressure actuated means respectively connected with said members for selectively seating said check means.

8. In a valve of the character described, a cylindrical wall, head members sleeved to the ends of said wall and having inwardly facing check seats, radial guide means connecting the head members, a check member slidably supported by said guide means to engage either one of said seats, a cylinder carried by one of the head members, and a piston slidable in the cylinder and connected with the check member.

9. In a valve of the character described, a cylindrical pipe section, ring-shaped head members secured to the ends of the pipe section and having inwardly facing check seats, cylinders supported by said head members, pistons in the cylinders, a check member movably supported between said seats, a check piston slidable in the check member, pistons connected to the check member and check piston, and means for injecting a pressure medium in said cylinders for actuating the check member.

10. In a valve of the character described, a shell member having inlet and outlet seats, check supporting means between said seats, a check member slidable in said supporting means in response to flow surge through said seats and having a pressure cylinder, a member movable in the pressure cylinder, means for creating pressure differential within and without said cylinder for unseating said check member, and means for selectively seating the check member including a pair of auxiliary cylinders and pistons slidable in said auxiliary cylinders and respectively connected with the check member and said member slidable in the pressure cylinder.

11. A check valve including a housing having a check seat, a check member movable in the housing to engage said seat and having a check piston cylinder therein, a check piston in the cylinder, an auxiliary piston connected with the check piston, an auxiliary cylinder in the housing for mounting said auxiliary piston, means for selectively applying external pressure to said auxiliary cylinder to seat the check member on said check seat, and means for maintaining a constant pressure in said check cylinder during movement of said check member whereby said pressure tends to restore said check member to neutral position upon release of said external pressure.

12. In a valve of the character described, a shell member having inlet and outlet seats, check supporting means between said seats, a check member slidable in said supporting means in response to flow surge through said seats and having a pressure cylinder, a member movable in the pressure cylinder, means for creating pressure differential within and without said cylinder for unseating said check member, and separate pressure actuated means respectively connected with said members for selectively seating the check member.

ALFRED J. DIESCHER.